Patented July 14, 1936

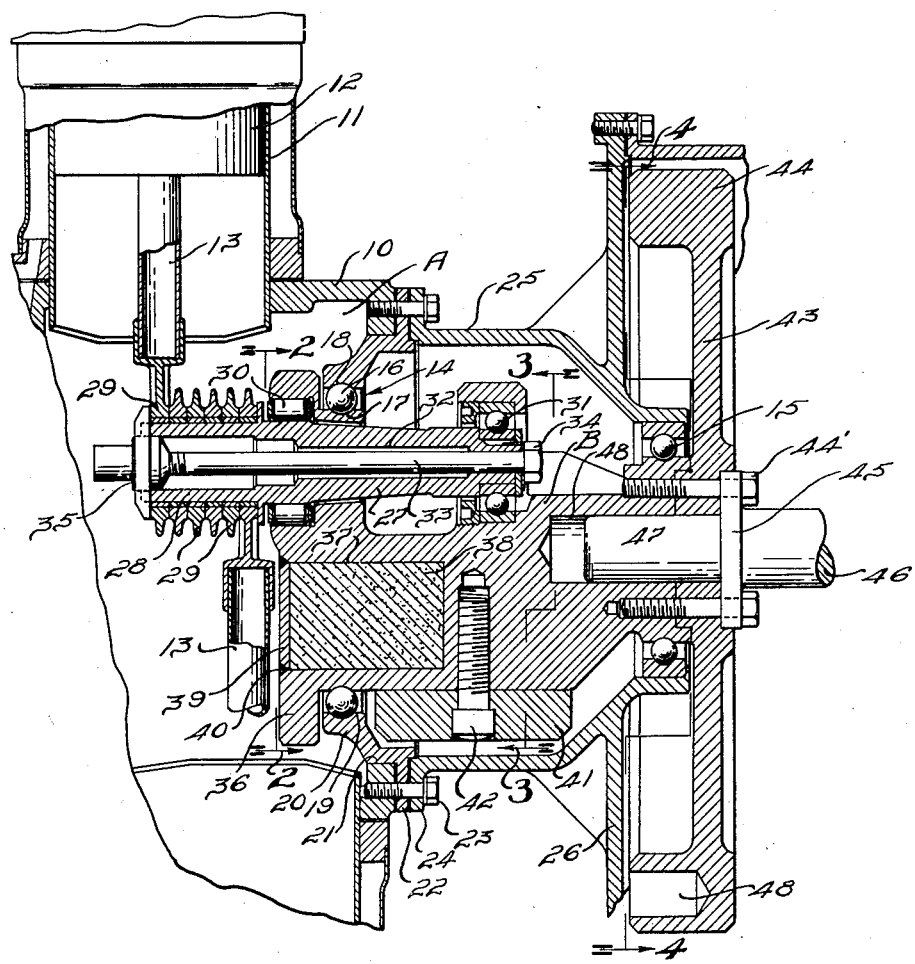

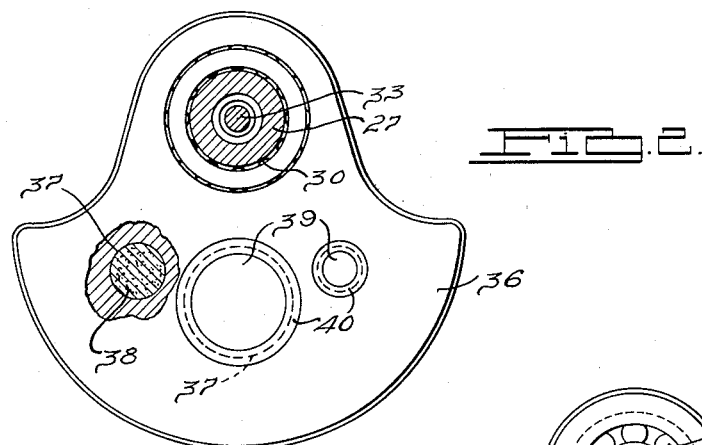
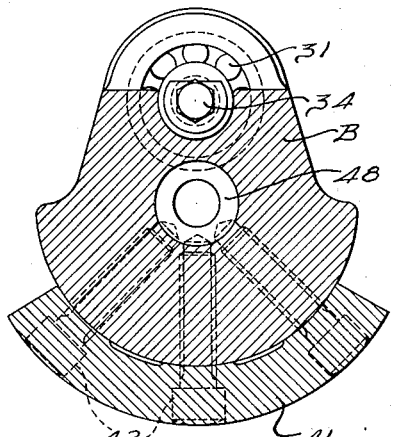
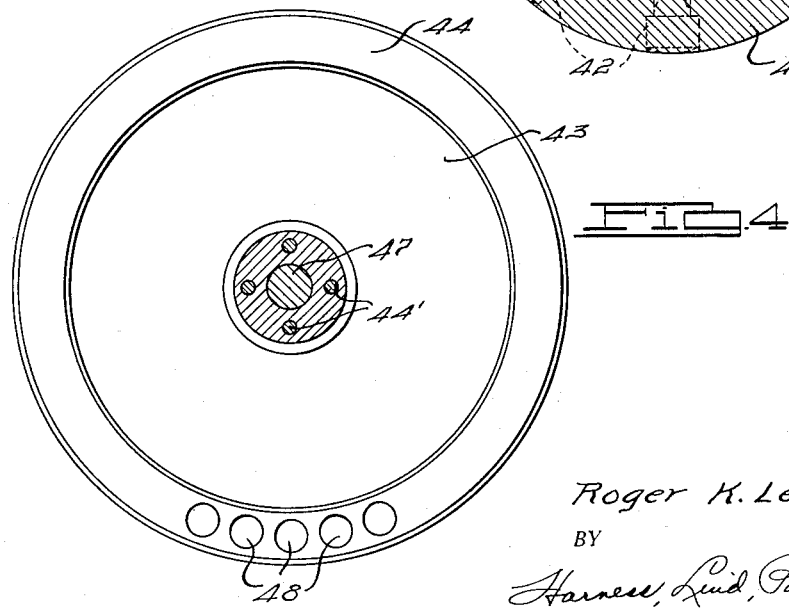

2,047,420

UNITED STATES PATENT OFFICE 2,047,420

INTERNAL COMBUSTION ENGINE

Roger K. Lee, Highland Park, Mich., assignor to Chrysler Corporation, Detroit, Mich., a corporation of Delaware Application July 19, 1934, Serial No. 735,943

12 Claims. (Cl. 74—603)

This invention relates to internal combustion engines and refers more particularly to improvements in engine crankshafts.

My invention is especially adapted for use in engines of the types having their cylinders radially arranged about the crankshaft although my invention, in its broader aspects, is not limited to engines of the radial type.

An object of my invention is to provide improved means for counterbalancing an engine at the crankshaft whereby the crankshaft bearing loads are minimized with attendant smoothness of running, minimization of friction losses, and improved efficiency and economy of operation.

A further object of my invention, in its more limited aspects, is to provide counterweighting means of improved effectiveness with a maximum of counterbalancing mass located in an improved manner to occupy a minimum of space. I am thus enabled to provide a relatively light-weight engine and to maintain the bearing sizes relatively small, such factors being constantly striven for in the art to which my invention relates.

My invention, as foresaid, has particular significance in connection with radial type engines and more particularly in connection with radial engines having a load-receiving cantilever crank pin of the type disclosed and claimed in my copending application Serial No. 657,146, filed February 16, 1933.

Further objects of my invention reside in the provision of an improved arrangement of crankshaft bearings in an engine crank case structure for minimization of weight and space, and for an effective arrangement of counterweights.

Further objects and advantages of my invention will be more apparent from the following detailed description of one embodiment of the principles of my invention, reference being had to the accompanying drawings, in which:

Fig. 1 is a sectional elevational view through the crankcase of my engine.

Fig. 2 is a detail sectional elevational view along the line 2—2 of Fig. 1.

Figs. 3 and 4 are detail sectional views respectively along the lines 3—3 and 4—4 of Fig. 1.

In the drawings, referring particularly to Fig. 1, it will be apparent that I have illustrated my invention in connection with a multicylinder radial engine wherein the main body portion 10 of the crankcase structure A supports the engine cylinders 11.

Each cylinder 11 has a working piston 12 associated therewith in the customary manner, a connecting rod 13 connecting each piston with the crankshaft structure B. The crankshaft is journaled for rotation in the crankcase A by a pair of longitudinally spaced bearings 14 and 15 preferably of the anti-friction type.

In connection with the anti-friction bearing 14 it will be noted that the balls 16 thereof operate in an inner ball race 17 formed directly in the forwardly enlarged end portion of the crankshaft, the outer race 18 being formed directly within the crankshaft receiving opening 19 of the transverse crankcase wall bracket member 20.

This bracket member 20 has a cylindrical portion fitting within the opening 21 of the crankcase body portion 10 and is also provided with an outwardly extending annular flange 22 engaging the rear face of the body portion 10 and secured thereto by a plurality of threaded fasteners 23. The fasteners 23 also secure the forward annular flange 24 of the rearwardly extending end crankcase member 25 to the body portion 10, the flange 22 lying intermediate the end member 25 and body portion 10 as illustrated in Fig. 1.

By machining or grinding the ball races 17 and 18 directly in the crankshaft B and bracket 20, respectively, I have eliminated the necessity for separate races and a saving in space is also obtained. The inwardly tapering rear end of the crankcase end member 25 is adapted to carry the rear bearing 15, this end member being further provided with a flywheel housing 26 adjacent the rear end portion thereof as will be presently more apparent.

The crankshaft B carries a spindle 27 eccentrically mounted in the crankshaft whereby the longitudinal axis of the spindle is offset with respect to the axis of rotation of the crankshaft. The spindle 27 extends through the bearing 14 and forwardly beyond the front end of the crankshaft B to provide a load-receiving cantilever crank pin portion 28 adapted to receive the inner bearings 29 of the connecting rods 13 for imparting rotation to the crankshaft.

The spindle 27 is preferably rotatably mounted in the crankshaft B by a pair of longitudinally spaced anti-friction bearings 30 and 31. The arrangement of the crankshaft and spindle bearings is preferably such that the forward crankshaft bearing 14 lies intermediate the spindle bearings 30 and 31 in a direction longitudinally of the crankshaft.

The spindle 27 is preferably bored out longitudinally as indicated at 32 to receive a relatively long bolt 33 axially thereof. The rear end of the bolt has a head 34 engaging the bearing assembly 31, the forward end of the bolt threadedly engaging an abutment member 35 adapted to prevent axial displacement of the connecting rod bearings 29 from the crank pin 28.

Referring now to my improved crankshaft counterbalancing means, it will be apparent that during operation of the engine, particularly at relatively high speeds, it is desirable that all moving parts of the engine should be as perfectly balanced as possible. The masses which normally cause unbalance of the engine are the crank pin spindle 27 and the connecting rod and piston assemblies connected thereto, all of which are eccentric or offset with respect to the axis of the crankshaft. During rotation of the crankshaft, the crank pin spindle thus exerts an outwardly directed force relative to the axis of the crankshaft and for opposing and counteracting this force, I have provided an exceedingly compact and efficiently arranged counterweighting means which, in the present embodiment of my invention, comprises several masses disposed diametrically opposite the spindle 27 in their combined effect.

It would, of course, be desirable to counterweight the crankshaft in the plane of the forces acting on the cantilever portion 28 but the operation of the connecting rods would obviously interfere with location of counterweighting means at such points.

I have therefore provided an outwardly extending counterweight 36 at the forward end of the crankshaft B, this counterweight being located forwardly of the bearing 14 and closely adjacent the connecting rod assemblies.

The counterweight 36 is supplemented by additional counterweighting means as follows. The forward portion of the crankshaft is provided with one or more cylindrical pockets 37 extending longitudinally rearwardly from the forward face of the crankshaft B, each pocket being filled with a counterweight 38 comprising a material of relatively high specific gravity with reference to the material forming the crankshaft, the latter being a customary steel.

Because of its relatively heavy weight for a given mass, I preferably fill each of the pockets 37 with tungsten or other equivalent metal or alloy, the tungsten being preferably inserted in a powdered or finely comminuted state. This comminuted material is preferably inserted in the pocket 37 under a relatively great pressure in order to realize as much counterweighting force as possible for the space available. Thus, by way of example, the comminuted material may be inserted in the pockets under a pressure approximating even as high as 40,000 pounds per square inch, and since the specific gravity of tungsten is in the neighborhood of more than twice that of most steels, it will be apparent that I have provided a very effective counterweighting means for a given space occupied thereby. After the pockets 37 are filled as aforesaid, the forward opening of each pocket is preferably closed by a disc 39 securely held in position as by welding as indicated at 40.

When necessary the counterweights 36 and 38 may be further supplemented by an additional counterweight 41 of arcuate form as best shown in Fig. 3, this counterweight being removably secured to the crankshaft B by the threaded fasteners 42. It will be noted that the counterweights 36 and 41 extend outwardly of the crankshaft B beyond the race 17 of bearing 14 and in order to expedite the machining or grinding of this race, one of these counterweights and preferably the counterweight 41 is removably secured to the crankshaft so that it may be applied thereto after the machining operation of the race 17 is completed. Furthermore, the insertion and removal of the crankshaft with respect to the bracket 20 and other parts of the crankcase structure A is facilitated by reason of the separate attachment of the counterweight 41 with the crankshaft. In Fig. 1 it will be noted that the counterweights 36 and 41 extend radially beyond the bearing 14, the counterweights 38 extending through the bearing 14 and the counterweight 41 lying closely adjacent the bearing 14 and rearwardly thereof.

It will be apparent that the combined effect of the counterweights 36, 38 and 41 acting in the opposite direction to that of the force exerted on the crank pin spindle will result in a moment acting in a direction longitudinally of the crankshaft, it being desirable in the interests of static and dynamic balance of the crankshaft to substantially neutralize this moment.

In order to oppose the aforesaid moment I have provided a counterbalancing weight spaced relatively remotely from the aforesaid counterweighting means whereby the force arm of the moment is relatively long, thus requiring a correspondingly smaller counterbalancing mass to produce the desired moment neutralizing effect.

Thus, rearwardly adjacent the rear crankshaft bearing 15 is a flywheel 43 rotatable with the crankshaft by reason of the connecting bolts 44', these bolts also passing through a flange 45 of the power take-off shaft 46, the latter having a forwardly extending end portion 47 piloted in the rearwardly opening axial bore 48 of the crankshaft.

The flywheel 43 has its counterbalancing mass 44 positioned in opposition to the aforesaid counterweighting means so that the center of gravity of the counterbalancing mass 44 lies in a plane containing the axes of the spindle 27 and crankshaft B. In order to conveniently provide the mass 44, according to the present embodiment of my invention, this mass is provided by the removal of the desired amount of material from the diametrically opposite portion of the flywheel as best indicated by the drilled out holes 48 in Fig. 4. By removing the proper amount of material it will be apparent that the flywheel 43 provides the counterbalancing mass 44 for accomplishing the desired effect of opposing and substantially neutralizing the aforesaid moment acting on the crankshaft B.

While I have illustrated and described my invention in connection with improvements in internal combustion engines, I desire to point out that many of the features of my invention are obviously adaptable to advantage in other generally analogous devices such as pumps, compressors, and the like. My novel crankshaft and associated parts, for example, are obviously adaptable for use wherever it is desired to transfer reciprocating forces to rotary motion or vice versa.

Various modifications and changes will be apparent from the teachings of my invention, as set forth in the appended claims, and it is not my intention to limit my invention to the particular details of construction and operation shown and described for illustrative purposes.

What I claim is:

1. In a device of the character described, a crankshaft, a bearing journaling one end of said crankshaft for rotation about its axis, a spindle eccentrically carried by said crankshaft and having a cantilever crank pin projecting from said crankshaft end, said crankshaft having a counterweight adjacent each side of said bearing longitudinally of the crankshaft and diametrically opposed to said spindle, said counterweights extending outwardly beyond said bearing, and means for removably securing one of said counterweights to said crankshaft.

2. In a device of the character described, having a crankcase body member, a transversely extending bracket connected to said body member and having an opening, a crankshaft extending through said opening, complementary races formed in said crankshaft and said bracket opening, anti-friction bearing elements operating in said races for journaling the crankshaft in said bracket opening, said crankshaft having a counterweight adjacent each side of said bracket longitudinally of said crankshaft, said counterweights extending outwardly beyond said bracket race, and means for securing one of said counterweights to said crankshaft.

3. In a motion transmitting device having a crankcase body member, a transversely extending bracket connected to said body member and having an opening, a crankshaft extending through said opening, complementary races formed in said crankshaft and said bracket opening, anti-friction bearing elements operating in said races for journaling the crankshaft in said bracket opening, said crankshaft having a counterweight adjacent each side of said bracket longitudinally of said crankshaft, said counterweights extending outwardly beyond said bracket race, one of said counterweights being integral with said crankshaft, and means for removably securing the other of said counterweights to said crankshaft.

4. In a motion transmitting device having a crankcase body member, a transversely extending bracket connected to said body member and having an opening, a crankshaft extending through said opening, complementary races formed in said crankshaft and said bracket opening, anti-friction bearing elements operating in said races for journaling the crankshaft in said bracket opening, said crankshaft having a counterweight adjacent each side of said bracket longitudinally of said crankshaft, said counterweights extending outwardly beyond said bracket race, means for securing one of said counterweights to said crankshaft, and a crank pin carried by said crankshaft and projecting through said bracket opening.

5. In a motion transmitting device having a crankcase structure, a crankshaft journaled in said crankcase structure, a crank pin eccentrically carried by said crankshaft, counterweighting means carried by said crankshaft within said crankcase structure and lying to one side of the crankshaft axis opposite to the side thereof occupied by said crank pin, said counterweighting means producing a couple acting on said crankshaft in its longitudinal direction, a bearing for said crankshaft adjacent one end of said crankcase structure, and counterbalancing means rotatable with said crankshaft and cooperating with said counterweighting means to oppose and substantially neutralize the effect of said couple, said crankshaft bearing lying intermediate said counterbalancing means and said crank pin.

6. In a motion transmitting device having a crankcase structure, a crankshaft journaled in said crankcase structure, a crank pin having its axis parallel to the crankshaft axis and offset therefrom, said crank pin having a load-receiving cantilever portion projecting beyond one end of said crankshaft, counterweighting means carried by said crankshaft within said crankcase structure and lying to one side of the crankshaft axis opposite to the side thereof occupied by said crank pin, said counterweighting means producing a couple acting on said crankshaft in its longitudinal direction, a bearing for said crankshaft adjacent one end of said crankcase structure, and counterbalancing means rotatable with said crankshaft and cooperating with said counterweighting means to oppose and substantially neutralize the effect of said couple, said crankshaft bearing lying intermediate said counterbalancing means and said crank pin.

7. In a motion transmitting device having a crankcase body member and an end crankcase member secured thereto, a bracket extending inwardly of the crankcase structure and having an outer flange secured to said crankcase structure intermediate said body member and said end member, a crankshaft journaled in said bracket, a bearing carried by said end member for additionally journaling said crankshaft, a crank pin eccentrically carried by the crankshaft, counterweighting means carried by said crankshaft and lying to one side of the crankshaft axis opposite to the side thereof occupied by said crank pin, said counterweighting means producing a couple acting on said crankshaft in its longitudinal direction, and counterbalancing means located beyond said bearing, said counterbalancing means being rotatable with said crankshaft and cooperating with said counterweighting means to oppose said couple.

8. In a multi-cylinder motion transmitting device of the radial type having a crankcase structure disposed centrally thereof, a crankshaft rotatably journalled in said crankcase structure and disposed at one end of the device, a spindle eccentrically carried by said crankshaft and having a load receiving cantilever crank pin portion projecting beyond one end of said crankshaft, counterweighting means carried by said crankshaft and lying to one side of the crankshaft axis opposite to the side thereof occupied by said crank pin, said counterweighting means producing a couple acting on said crankshaft in its longitudinal direction, a flywheel carried by said crankshaft adjacent the other end thereof, said flywheel having a counterweight cooperating with said counterweighting means to produce a couple acting on said crankshaft in opposition to the first said couple, and bearings carried by the crankcase structure for journalling said crankshaft, one of said bearings being disposed adjacent said flywheel, another of said bearings being disposed adjacent the first said end of said crankshaft, said counterweighting means comprising masses respectively disposed at each side of the last said bearing and each of said masses extending radially beyond the last said bearing.

9. In an internal combustion engine having a crankcase structure, a crankshaft journaled in said crankcase structure, a crank pin having its axis parallel to the crankshaft axis and offset therefrom, said crank pin having a load receiving cantilever portion projecting beyond one end of said crankshaft, counterweighting means carried by said crankshaft and lying to one side thereof occupied by said crank pin, said counterweighting means producing a couple acting on said crankshaft in its longitudinal direction, and counterbalancing means rotatable with said crankshaft and cooperating with said counterweighting means to oppose and substantially neutralize the effect of said couple, means for journaling said crankshaft in said crankcase structure including a bearing adjacent one end of said crankshaft, said counterweighting means comprising a mass projecting radially beyond said bearing at each side of said bearing.

10. In an engine having a crankcase structure, a crankshaft, a bearing journalling said crankshaft in said crankcase structure, said crankshaft having a pocket extending generally longitudinally thereof and through said bearing, and a counterweighting mass in said pocket.

11. In an engine of the radial type having a crankcase structure, a crankshaft disposed at one end of said engine in said crankcase structure, longitudinally spaced bearings journalling said crankshaft, a spindle journalled eccentrically in said crankshaft and having a load receiving cantilever crank pin portion thereof projecting beyond one end of said crankshaft, said crankshaft having a pocket eccentrically disposed substantially diametrically opposite said spindle, and a counterweighting mass in said pocket.

12. In an engine of the radial type having a crankcase structure, a crankshaft disposed at one end of said engine in said crankcase structure, longitudinally spaced bearings journalling said crankshaft, a spindle journalled eccentrically in said crankshaft and having a load receiving cantilever crank pin portion thereof projecting beyond one end of said crankshaft, said crankshaft having a pocket eccentrically disposed substantially diametrically opposite said spindle, and a counterweighting mass in said pocket, said spindle and said pocket extending longitudinally of said crankshaft through one of said bearings.

ROGER K. LEE.